United States Patent
Kozko (10) Patent No.: US 9,589,350 B1
(45) Date of Patent: Mar. 7, 2017

(54) UTILIZING THREE OVERLAPPING IMAGES FOR EXPOSURE CORRECTION DURING PANORAMIC IMAGE STITCHING

(71) Applicant: Dmitry Kozko, Aventura, FL (US)

(72) Inventor: Dmitry Kozko, Aventura, FL (US)

(73) Assignee: 360 LAB LLC., Miami, FL (US)

( * ) Notice: Subject to any disclaimer, the term of this patent is extended or adjusted under 35 U.S.C. 154(b) by 224 days.

(21) Appl. No.: 14/272,846

(22) Filed: May 8, 2014

Related U.S. Application Data (60) Provisional application No. 61/956,057, filed on May 30, 2013.

(51) Int. Cl.

| | |
|---|---|
| G06T 7/00 | (2006.01) |
| H04N 5/232 | (2006.01) |
| H04N 5/235 | (2006.01) |
| G06T 5/50 | (2006.01) |
| G06T 5/00 | (2006.01) |
| G06T 5/40 | (2006.01) |

(52) U.S. Cl.
CPC ............ *G06T 7/0024* (2013.01); *G06T 5/007* (2013.01); *G06T 5/40* (2013.01); *G06T 5/50* (2013.01); *H04N 5/2355* (2013.01); *H04N 5/23238* (2013.01); *G06T 2207/10004* (2013.01); *G06T 2207/10024* (2013.01); *G06T 2207/20208* (2013.01); *G06T 2207/20221* (2013.01)

(58) Field of Classification Search
CPC .... H04N 5/2624; G06T 7/0034; G06T 7/0024
See application file for complete search history.

(56) References Cited

U.S. PATENT DOCUMENTS

| 6,393,162 B1 * | 5/2002 | Higurashi | G06T 5/006 345/629 |
|---|---|---|---|
| 2010/0045774 A1 * | 2/2010 | Len | G02B 13/06 348/36 |
| 2011/0293179 A1 * | 12/2011 | Dikmen | G06T 5/008 382/167 |
| 2012/0307000 A1 * | 12/2012 | Doepke | G06T 7/0034 348/36 |
| 2012/0314945 A1 * | 12/2012 | Cha | G06T 3/4038 382/167 |

* cited by examiner

*Primary Examiner* — Tung Vo
*Assistant Examiner* — Rowina Cattungal
(74) *Attorney, Agent, or Firm* — Patents on Demand P.A.; Brian K. Buchheit; Scott M. Garrett (57) ABSTRACT

A method for panorama exposure correction can begin with the receiving of a hemispherical-coverage panoramic digital image set by a panoramic image stitching system. The hemispherical-coverage panoramic digital image set can be comprised of a ceiling image and at least three side images that are all captured simultaneously. The images of the image set can be aligned to create a panoramic image. Based on the alignment, overlapping regions between two adjacent side images and the ceiling image can be identified, the placement of blending seams can be determined, and the region of each image affected by a exposure correction can be determined. The exposure correction for each identified overlapping region can be determined. The exposure of the affected region of each image can then be adjusted in accordance with the determined exposure correction. A gradient blending can be performed for a predefined area across the blending seams.

20 Claims, 5 Drawing Sheets

Ceiling Image 405

408

Side Images 410

UTILIZING THREE OVERLAPPING IMAGES FOR EXPOSURE CORRECTION DURING PANORAMIC IMAGE STITCHING

CROSS-REFERENCE TO RELATED APPLICATIONS

This application claims priority to provisional application No. 61/956,057, entitled "System and Method for Stitching Videos Received from Multiple Unsynchronized Cameras", filed May 30, 2013. This application also claims priority to pending application Ser. No. 14/144,683, entitled "Pre-Production Synchronization of Multiple, Independent Panoramic Digital Image Capture Devices", filed Dec. 31, 2013. The aforementioned applications are incorporated by reference herein, in their entirety.

BACKGROUND

The present invention relates to the field of digital image manipulation and, more particularly, to utilizing three overlapping images for exposure correction during panoramic image stitching.

Panoramic images and video are becoming popular as a visual medium. Advances in photographic and video technology have made the capture and creation of panoramic images and video easier and available to general consumers, not just professionals.

A panoramic image stitching system (e.g., software application) is used to stitch the images together. In order to create a cohesive panorama, the image stitching system often performs a variety of manipulations on the images. A common manipulation is exposure correction. While exposure is often considered a setting of the camera, time and environmental changes are also factors.

Conventional approaches to exposure correction are based upon an overlapping region between two images. Since this is a comparison of just two data points, the exposure is often skewed when the values differ by a considerable margin.

BRIEF SUMMARY

One aspect of the present invention can include a method for panorama exposure correction that begins with the receiving of a hemispherical-coverage panoramic digital image set by a panoramic image stitching system. The hemispherical-coverage panoramic digital image set can be captured by a hemispherical-coverage panoramic digital image capture device that utilizes a hemispherical panoramic camera module comprising at least three side digital cameras in fixed positions circumferentially-parallel with a base of the hemispherical panoramic camera module and one ceiling digital camera in a fixed upwards position perpendicular to the at least three circumferentially-parallel digital cameras. A field of view of each side digital camera can overlap with the field of view of its neighboring side digital cameras and the field of view of the ceiling digital camera. The hemispherical-coverage panoramic digital image set can be comprised of a ceiling image and at least three side images that are all captured simultaneously. The images of the hemispherical-coverage panoramic digital image set can be aligned to create a panoramic image. Based on the alignment, overlapping regions between two adjacent side images and the ceiling image can be identified. Based on the alignment and identified overlapping regions, the placement of blending seams can be determined. A blending seam can be an artificial vertical line that acts as a boundary between exposure corrections performed for two overlapping regions. The blending seam can be placed at a halfway point between the two overlapping regions in a non-terminal side image. The blending seams can be extended onto the ceiling image. Based on the alignment and identified overlapping regions, the region of each image to be affected by a exposure correction of the overlapping region can be determined. The affected region of a terminal side image can be the entirety of the terminal side image; the affected region of the non-terminal side image can be horizontally bounded by an edge contained in the overlapping region and the blending seam of the non-terminal side image; the affected region of the ceiling image can be horizontally bounded by a terminating edge and the blending seam or two blending seams. The exposure correction for each identified overlapping region can be determined to normalize the exposure between the two adjacent side images and ceiling image. The exposure of the affected region of each image contributing to the overlapping region can then be adjusted in accordance with the determined exposure correction. A gradient blending can be performed for a predefined area across the blending seams.

Another aspect of the present invention can include a computer program product that includes a computer readable storage medium having embedded computer usable program code. The computer usable program code can be configured to receive a hemispherical-coverage panoramic digital image set that was captured by a hemispherical-coverage panoramic digital image capture device that utilizes a hemispherical panoramic camera module comprising at least three side digital cameras in fixed positions circumferentially-parallel with a base of the hemispherical panoramic camera module and one ceiling digital camera in a fixed upwards position perpendicular to the at least three circumferentially-parallel digital cameras. The field of view of each side digital camera can overlap with the field of view of its neighboring side digital cameras and the field of view of the ceiling digital camera. The hemispherical-coverage panoramic digital image set can be comprised of a ceiling image and at least three side images that are all captured simultaneously. The computer usable program code can be configured to align images of the hemispherical-coverage panoramic digital image set to create a panoramic image. The computer usable program code can be configured to, based on the alignment, identify overlapping regions between two adjacent side images and the ceiling image. The computer usable program code can be configured to, based on the alignment and identified overlapping regions, determine a placement of blending seams. A blending seam can be an artificial vertical line that acts as a boundary between exposure corrections performed for two overlapping regions. The blending seam can be placed at a halfway point between the two overlapping regions in a non-terminal side image. The blending seams can be extended onto the ceiling image. The computer usable program code can be configured to, based on the alignment and identified overlapping regions, determine a region of each image to be affected by a exposure correction of the overlapping region. The affected region of a terminal side image can be an entirety of the terminal side image; the affected region of the non-terminal side image can be horizontally bounded by an edge contained in the overlapping region and the blending seam of the non-terminal side image; the affected region of the ceiling image can be horizontally bounded by a terminating edge and the blending seam or two blending seams. The computer usable program code can be configured to determine the exposure correction for each identified overlapping region. The exposure correction can normalize exposure between the two adjacent side images and ceiling image. The computer usable program code can be configured to adjust the exposure of the affected region of each image contributing to the overlapping region in accordance with the determined exposure correction. The computer usable program code can be configured to perform a gradient blending for a predefined area across the blending seams.

Yet another aspect of the present invention can include a panoramic image stitching system that includes a hemispherical-coverage panoramic digital image set and a panoramic image stitching software application. The hemispherical-coverage panoramic digital image set can be captured by a hemispherical-coverage panoramic digital image capture device that utilizes a hemispherical panoramic camera module comprising at least three side digital cameras in fixed positions circumferentially-parallel with a base of the hemispherical panoramic camera module and one ceiling digital camera in a fixed upwards position perpendicular to the at least three circumferentially-parallel digital cameras. The field of view of each side digital camera can overlap with the field of view of its neighboring side digital cameras and the field of view of the ceiling digital camera. The hemispherical-coverage panoramic digital image set can be comprised of a ceiling image and at least three side images that are all captured simultaneously. The panoramic image stitching software application can be configured to generate a panoramic image from the hemispherical-coverage panoramic digital image set. The panoramic image stitching software application can further include a ceiling transformation module, a registration component, and a merging component. The ceiling transformation module can be configured to transform the ceiling image from an original perspective to a panorama perspective. The registration component can be configured to align adjacent side images with each other and the ceiling image in the panorama perspective. The merging component can be configured to combine the hemispherical-coverage panoramic digital image set as aligned by the registration component. The merging component can further comprises an improved exposure correction handler. The improved exposure correction handler can be configured to adjust a exposure of images in the hemispherical-coverage panoramic digital image set based upon luminance values in a region where two adjacent side images overlap with each other and the ceiling image

DETAILED DESCRIPTION

The present invention discloses a solution for improving exposure correction in panoramic image stitching by using a hemispherical-coverage panoramic digital image capture device. A hemispherical-coverage panoramic digital image capture device can utilize multiple side cameras and a ceiling camera, positioned perpendicular to the side cameras, to simultaneously capture images for a hemispherical-coverage panoramic image set. The side images can overlap with each other and the ceiling image. During the image stitching process, an improved exposure correction handler can use the region where the three images overlap as the basis for exposure correction for the images.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
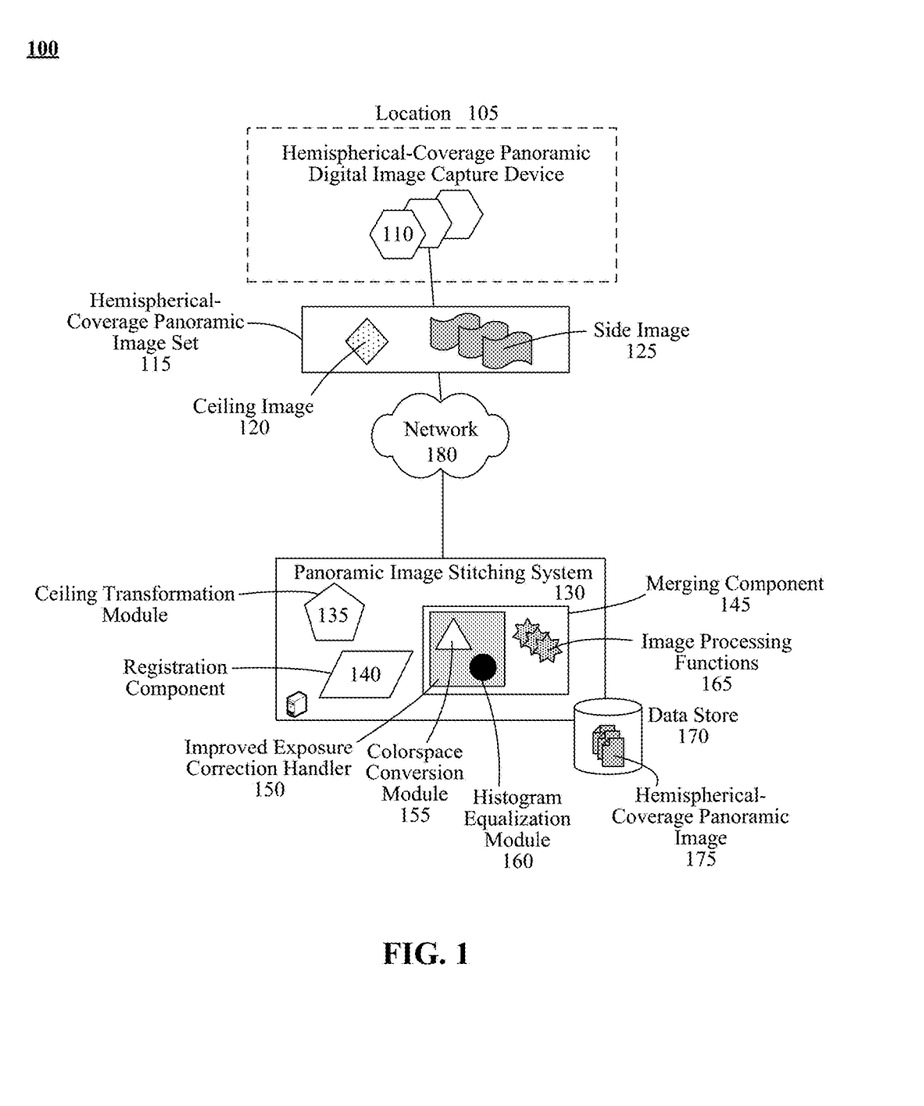
FIG. 1 is a schematic diagram illustrating a system that utilizes a panoramic image stitching system with an improved exposure correction handler to generate a hemispherical-coverage panoramic image from a hemispherical-coverage panoramic image set in accordance with embodiments of the inventive arrangements disclosed herein.

FIG. 1 is a schematic diagram illustrating a system 100 that utilizes a panoramic image stitching system 130 with an improved exposure correction handler 150 to generate a hemispherical-coverage panoramic image 175 from a hemispherical-coverage panoramic image set 115 in accordance with embodiments of the inventive arrangements disclosed herein. In system 100, one or more hemispherical-coverage panoramic digital image capture devices 110 can be used to capture multiple hemispherical-coverage panoramic image sets 115 of a location 105.

Location 105 can represent a variety of geographic areas capable of supporting operation of hemispherical-coverage panoramic digital image capture devices 110 installed therein. The location 105 can include indoor and/or outdoor environments. For example, the location 105 can be an open-air sports venue or an enclosed stadium.

A hemispherical-coverage panoramic digital image capture device 110 can be an electronic device having the hardware and/or software components required to capture a hemispherical-coverage panoramic image set 115. The hemispherical-coverage panoramic digital image capture device 110 can be discussed in more detail in subsequent Figures. As such, the hemispherical-coverage panoramic digital image capture device 110 can include multiple digital cameras (not shown) positioned in a hemispherical configuration, such as one digital camera pointing towards a ceiling of the location 105 and the remaining digital cameras oriented perpendicular to the ceiling camera along the sides of the device 110. Thus, the hemispherical-coverage panoramic image set 115 captured by the hemispherical-coverage panoramic digital image capture device 110 can represent a hemispherical view of the location 105.

Conventional panoramic image capture devices and/or methods can focus on only the horizontal axis when capturing images. For example, a digital camera can capture images as it rotates 360-degrees around a fixed point or a panoramic capture device can have multiple cameras that are positioned only in the horizontal plane.

Hence, the hemispherical-coverage panoramic image set 115 can include a ceiling image 120 captured by the digital camera pointing upwards and multiple side images 125 captured by the side-positioned digital cameras. As is common in panoramic photography, the digital cameras of the hemispherical-coverage panoramic digital image capture device 110 can have overlapping fields of view. The unique orientation of the digital cameras in the hemispherical-coverage panoramic digital image capture device 110 can produce additional overlapping regions between the images 120 and 15 of the hemispherical-coverage panoramic image set 115.

Side images 125 captured by neighboring digital cameras can overlap along their horizontal axis (i.e., at the left and right edges of the images 125). Additionally, each side image 125 can vertically overlap with the ceiling image 120. Thus, when the images 120 and 125 of the hemispherical-coverage panoramic image set 115 are aligned by the panoramic image stitching system 130, there can be regions where three images 120 and 125 (i.e., two adjacent side images 125 and the ceiling image 120) overlap. A visual illustration of this overlap can be presented in later Figures.

The hemispherical-coverage panoramic image set 115 can be conveyed to the panoramic image stitching system 130 over a network 180. In another embodiment, the hemispherical-coverage panoramic image set 115 can be physically transferred to the panoramic image stitching system 130 via a portable media storage device (i.e., without the use of network 180).

The panoramic image stitching system 130 can represent the hardware and/or software components necessary to create the hemispherical-coverage panoramic image 175 from the hemispherical-coverage panoramic image set 115. In addition to a registration component 140 and merging component 145, the panoramic image stitching system 130 can also include a ceiling transformation module 135. The panoramic image stitching system 130 can include a data store 170 for storing the generated hemispherical-coverage panoramic image 175.

The registration component 140 can be the software element that aligns the overlapping regions of the images 120 and 125 of the hemispherical-coverage panoramic image set 115 to create the hemispherical-coverage panoramic image 175. The hemispherical-coverage panoramic image 175 can be vertically larger than a typical panoramic image, due to the inclusion of the ceiling image 120 to the standard side images 125. Thus, the hemispherical-coverage panoramic image 175 can be a larger panorama that provide a more complete picture of the location 105.

As part of the alignment process, the contents of the ceiling image 120 can be matched with the corresponding side images 125. Therefore, the registration component 140 can invoke the ceiling transformation module 135 to perform a planar transformation of the ceiling image 120 (i.e., from the XY-plane of the ceiling camera to the XZ or YZ-plane of the side cameras).

The ceiling transformation module 135 can represent the software element configured to transform the ceiling image 120 from its original perspective (i.e., curvilinear or rectilinear) into a panoramic perspective that parallels the horizon of the side images 125. The ceiling transformation module 135 can utilize the additional image processing functions 165 to address imperfections, distortions, or missing elements.

For example, the ceiling image 120 can be a typical rectangular image. The edges of the ceiling image 120 can overlap with different side images 125. In its rectangular form, the ceiling image 120 cannot simultaneously overlap with all the side images 125. However, unraveling the rectangular image around a specified point can produce a panorama whose features overlap the upper portion of the aligned side images 125.

Once the images 120 and 125 are aligned, the merging component 145 execute a variety of operations to make the separate images 120 and 125 look more like a single panoramic image 175. The operation of particular pertinence to the present disclosure can be exposure correction. As such, the merging component 145 can include an improved exposure correction handler 150 as well as other image processing functions 165.

The additional image processing functions 165 can perform operations such as gradient blending, alpha blending, image cutting, cloning, straightening/rotating, color adjusting, and the like. In another embodiment, the image processing functions 165 can be components of the panoramic image stitching system 130 and not just the merging component 145. In yet another embodiment, these image processing functions 165 can be remotely-located and accessed by the panoramic image stitching system 130 over the network 180.

The improved exposure correction handler 150 can be the element of the merging component 145 configured to smooth exposure differences between the images 120 and 125. As used herein, the term "exposure" can be used to represent the luminance or brightness of an image 120 and 125. The improved exposure correction handler 150 can include a colorspace conversion module 155 and a histogram equalization module 160.

The colorspace conversion module 155 can convert an image 120 or 125 from one colorspace to another. Typical digital cameras can use the red, green, and blue (RGB) colorspace as a default; specialized or high-end digital camera can have the capability to capture images 120 and 125 using the hue, saturation, and value (HSV) colorspace, where the value channel corresponds to luminance. In the RGB colorspace, luminance, which is referred to as intensity, can be expressed as the average of the red, green, and blue components. Therefore, adjusting the intensity of a pixel when in the RGB colorpsace can alter its color composition, which can inadvertently change the color of the pixel.

In the HSV colorspace, luminance can be adjusted independently of color. Therefore, the improved exposure correction handler 150 can be configured to operate in the HSV colorspace. When the hemispherical-coverage panoramic image set 115 is captured in a different colorspace, typically RGB, the colorspace conversion module 155 can convert the images 120 and 125 to the HSV colorspace.

It should be noted that the concepts taught by the improved exposure correction handler 150 can be expanded upon to encompass other colorspaces (e.g., HSL, Luma/Chroma/Hue, CIELAB, etc.) where luminance or the corresponding brightness channel can be modified independent of color.

The histogram equalization module 160 can be the element configured to perform histogram equalization on the Value channel (luminance), as is known in the Art. Histogram equalization can be based upon the regions where three images 120 and 125 overlap (i.e., the two adjacent side images 125 and the ceiling image 120).

In another contemplated embodiment, the histogram equalization module 160 can perform specialized forms of histogram equalization, such as adaptive histogram equalization and contrast limited adaptive histogram equalization.

In another embodiment, the cameras of the hemispherical-coverage panoramic digital image capture device 110 can be digital video cameras. The hemispherical-coverage panoramic image set 115 can be comprised of video streams or files, whose frames are stitched together by the panoramic image stitching system 130.

As used herein, presented data store 170 can be a physical or virtual storage space configured to store digital information. Data store 170 can be physically implemented within any type of hardware including, but not limited to, a magnetic disk, an optical disk, a semiconductor memory, a digitally encoded plastic memory, a holographic memory, or any other recording medium. Data store 170 can be a stand-alone storage unit, a portable media storage device, or a storage unit formed from a plurality of physical devices. Additionally, information can be stored within data store 170 in a variety of manners. For example, information can be stored within a database structure or can be stored within one or more files of a file storage system, where each file may or may not be indexed for information searching purposes. Further, data store 170 can utilize one or more encryption mechanisms to protect stored information from unauthorized access.

Network 180 can include any hardware/software/and firmware necessary to convey data encoded within carrier waves. Data can be contained within analog or digital signals and conveyed though data or voice channels. Network 180 can include local components and data pathways necessary for communications to be exchanged among computing device components and between integrated device components and peripheral devices. Network 180 can also include network equipment, such as routers, data lines, hubs, and intermediary servers which together form a data network, such as the Internet. Network 180 can also include circuit-based communication components and mobile communication components, such as telephony switches, modems, cellular communication towers, and the like. Network 180 can include line based and/or wireless communication pathways.

Figure 2:
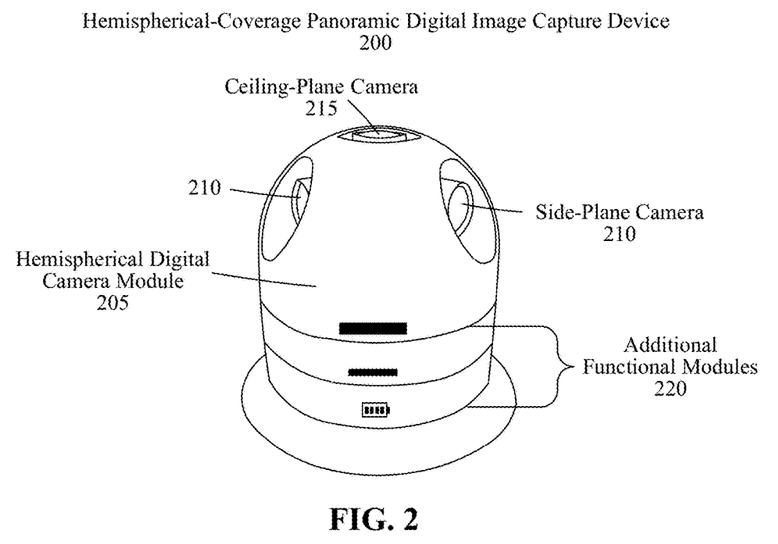
FIG. 2 is an illustration of a hemispherical-coverage panoramic digital image capture device in accordance with embodiments of the inventive arrangements disclosed herein.

FIG. 2 is an illustration of a hemispherical-coverage panoramic digital image capture device 200 in accordance with embodiments of the inventive arrangements disclosed herein. The hemispherical-coverage panoramic digital image capture device 200 of FIG. 2 can be used within the context of system 100.

As shown, the hemispherical-coverage panoramic digital image capture device 200 can be a modular device that comprises a hemispherical panoramic digital camera module 205 and one or more additional functional modules 220. The additional functional modules 220 can provide support for the hemispherical panoramic digital camera module 205 as well as additional device 200 functionality like network connectivity and data storage.

The hemispherical panoramic digital camera module 205 can include multiple side-plane digital cameras 210 and a single ceiling-plane digital camera 215. The side-plane digital cameras 210 can be digital cameras in fixed positions along the same horizon and at the same predetermined distance from a center point of the hemispherical panoramic digital camera module 205. The positions of the side-plane digital cameras 210 can be parallel to the base of the hemispherical panoramic digital camera module 205.

Further, it can be suggested that the side-plane digital cameras 210 be of identical models and utilize identical lens types to minimize differences in the quality of the captured digital images.

The ceiling-plane digital camera 215 can be a digital camera positioned perpendicular to the side-plane digital cameras 210, along a central axis of the hemispherical panoramic digital camera module 205. This orientation of the ceiling-plane digital camera 215 and the intrinsic overlapping fields of view can be further detailed in illustration 225 of FIG. 2A.

Figure 2A:
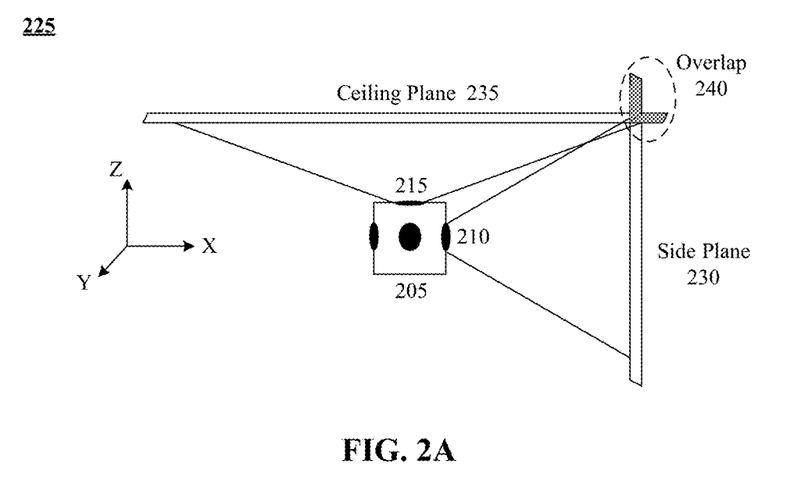
FIG. 2A is an example illustration of the view planes of the digital cameras of the hemispherical-coverage panoramic digital image capture device.

Speaking in Cartesian terms, each side-plane digital camera 210 can be positioned on the same X-Y intersecting plane and can capture an image of the surrounding space within a field of view, herein referred to as the side plane 230. The side plane 230 can be thought of as a two-dimensional plane, X-Z or Y-Z, depending upon the facing of the camera 210, of the surrounding space. The size of the side plane 230 as well as the appearance of objects within the side plane 230 can be affected by the properties and/or parameters of the optical components (e.g., focal length, lens type) of the side-plane digital cameras 210.

The ceiling-plane digital camera 215 can be positioned perpendicular to the side-plane digital cameras 210 (i.e., along the Z-axis). The ceiling-plane digital camera 215 can capture an image of its field of view, herein referred to as the ceiling plane 235. The ceiling plane 235 can be an X-Y plane of the surrounding space above the hemispherical panoramic digital camera module 205. Likewise, the size of the ceiling plane 235 as well as the appearance of objects within the ceiling plane 235 can be affected by the properties and/or parameters of the optical components (e.g., focal length, lens type) of the ceiling-plane digital camera 215.

The angle of view of the side-plane digital cameras 210 and the ceiling-plane digital camera 215 can be such to allow for overlap 240 between the side 230 and ceiling planes 235, which is in addition to the overlap (not shown) between the side planes 230 of neighboring side-plane digital cameras 210. Conventional panoramic image capture devices and methods can lack this additional region of overlap 240.

It should be noted that, for illustrative purposes, the side 230 and ceiling planes 235 can be shown, in illustration 225, to extend beyond the lines representing the cameras' 210 and 215 angle of view in order to emphasize the overlap 240 between the side 230 and ceiling planes 235. Normally, the field of view of a camera 210 and 215 can be bound by (i.e., cannot extend past) the angle of view.

The ceiling-plane digital camera 215 can be of the same type and/or configuration as the side-plane digital cameras 210. Alternately, the ceiling-plane digital camera 215 can use a different lens or set of image capture parameters, such as resolution, than the side-plane digital cameras 210. However, such differences can require additional processing by the panoramic image stitching system.

The side-plane digital cameras 210 and ceiling-plane digital camera 215 can be configured to synchronously capture image. This synchronization can help to minimize time-delay-induced differences in the hemispherical-coverage panoramic image set. The exact point in time when an image is captured can vary greatly when using an unsynchronized conventional panoramic image capture device or a conventional method where the camera is moved or rotated. Changes can occur within the environment that affect the luminance of the captured image in the time between image captures.

For example, a user with a typical digital camera can take the first image of their image set at time A (t=A). The user must now move/rotate the camera and/or their self into position to capture the second image. The variable, G, can represent the amount of time that elapses before the second image is captured; thus, the time at which the second image is captured can be expressed as t=A+G. Depending on the magnitude of G and the conditions of the environment, many things can occur that affect the lighting of the environment, such as cloud cover, sun movement, lights turning on or off, and so on. Such exposure differences due to time can be reduced due to the synchronized nature of the hemispherical panoramic digital camera module 205.

Figure 3:
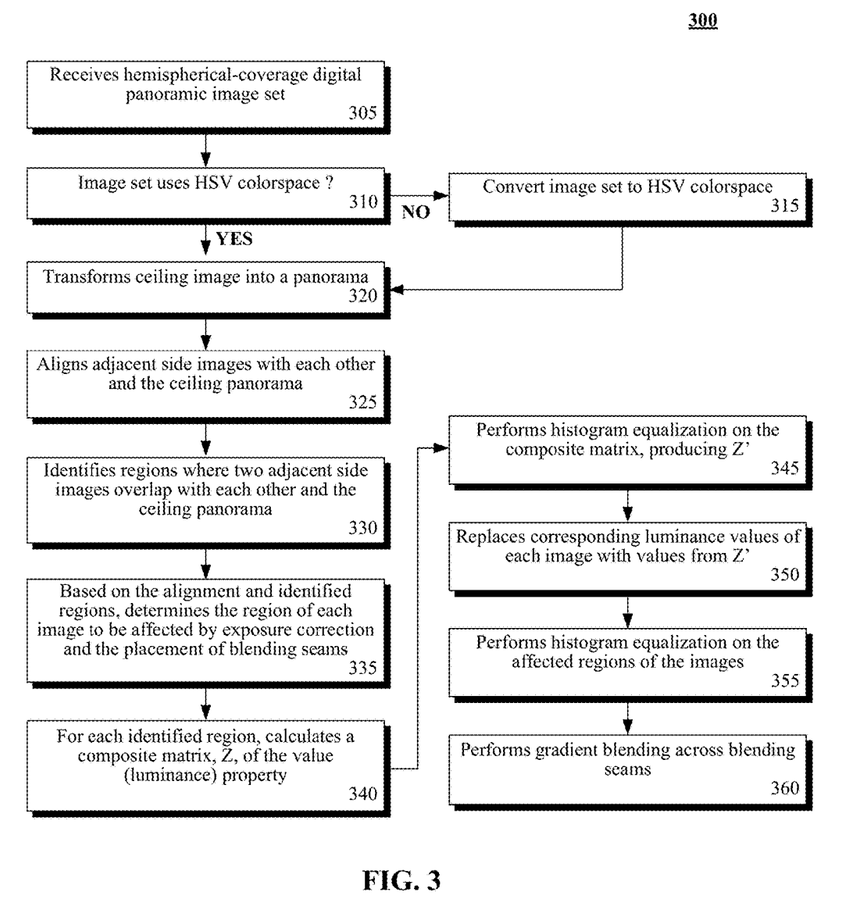
FIG. 3 is a flowchart of a method describing the general operation of the improved exposure correction handler in accordance with embodiments of the inventive arrangements disclosed herein.

FIG. 3 is a flowchart of a method 300 describing the general operation of the improved exposure correction handler in accordance with embodiments of the inventive arrangements disclosed herein. Method 300 can be performed within the context of system 100.

Method 100 can begin in step 105 where the improved exposure correction handler can receive the hemispherical-coverage panoramic image set. IT can be determined if the image set uses the hue, saturation, value (HSV) colorspace in step 310.

When the image set does not use the HSV colorspace, step 315 can be performed where the images of the image set are converted to the HSV colorspace. Upon completion of step 315 or when the image set already uses the HSV colorspace, the ceiling image can be transformed from its original perspective to a panorama perspective in step 320.

In step 325, adjacent side images can be aligned with each other and the ceiling panorama. Regions where the two adjacent side images overlap with each other and the ceiling panorama can be identified in step 330. Based on the image alignment and the identified regions, step 335 can determine the region of each image to be affected by the exposure correction and the placement of blending seams.

A blending seam can represent a vertical boundary between regions of an image that are to be affected by different exposure corrections. A non-terminal image of the panorama (i.e., a middle image) can overlap with two other side images (i.e., one on the left and one on the right), in addition to the ceiling image. Each region of overlap can warrant a different amount of exposure correction, and, most likely, neither exposure correction should be applied to the image as a whole. That is, the exposure correction for the left-side overlap can be considered more applicable to the left half of the image, and exposure correction for the right-side to the right half.

It should be noted that the blending seam can be a positional marker noted by the improved exposure correction handler; not a property of the images.

For each identified region where the three images (2 side images and the ceiling image) overlap, a composite matrix, Z, can be calculated for the value (luminance) property in step 335. For the purposes of this explanation, it can be helpful to think of each image as a matrix of luminance values; L can represent the left image's luminance, R can represent the right image, and C can represent the ceiling image. The overlap region can identify a subset of values within each of the matrices L, R, and C; the sub-matrices D, E, and F. Step 335 can utilize D, E, and F to calculate Z.

The calculation performed in step 335 can represent an applicable computational formula and/or transformation, such as taking the average of the three values at each position (m, n), where $0 \leq m \leq M$ and $0 \leq n \leq N$, and M and N are the dimensions of the L, R, C, and Z.

In step 345, histogram equalization can be performed on Z to produce Z'. The luminance values of sub-matrices D, E, and F can be replaced with the values of Z' in step 350, changing values in matrices L, R, and C. It should be noted that the luminance values of the images were not modified prior to step 350.

In step 355, histogram equalization can be performed on the affected regions of the images. That is, histogram equalization can be performed on the portion of the matrices L, R, and C affected by the exposure correction, as previously determined in step 335. Gradient blending can be performed across the blending seams in step 360 to reduce differences between adjacent exposure correction areas.

In another contemplated embodiment, the histogram equalization can include weighting values to further smooth exposure transitions.

Figure 4:
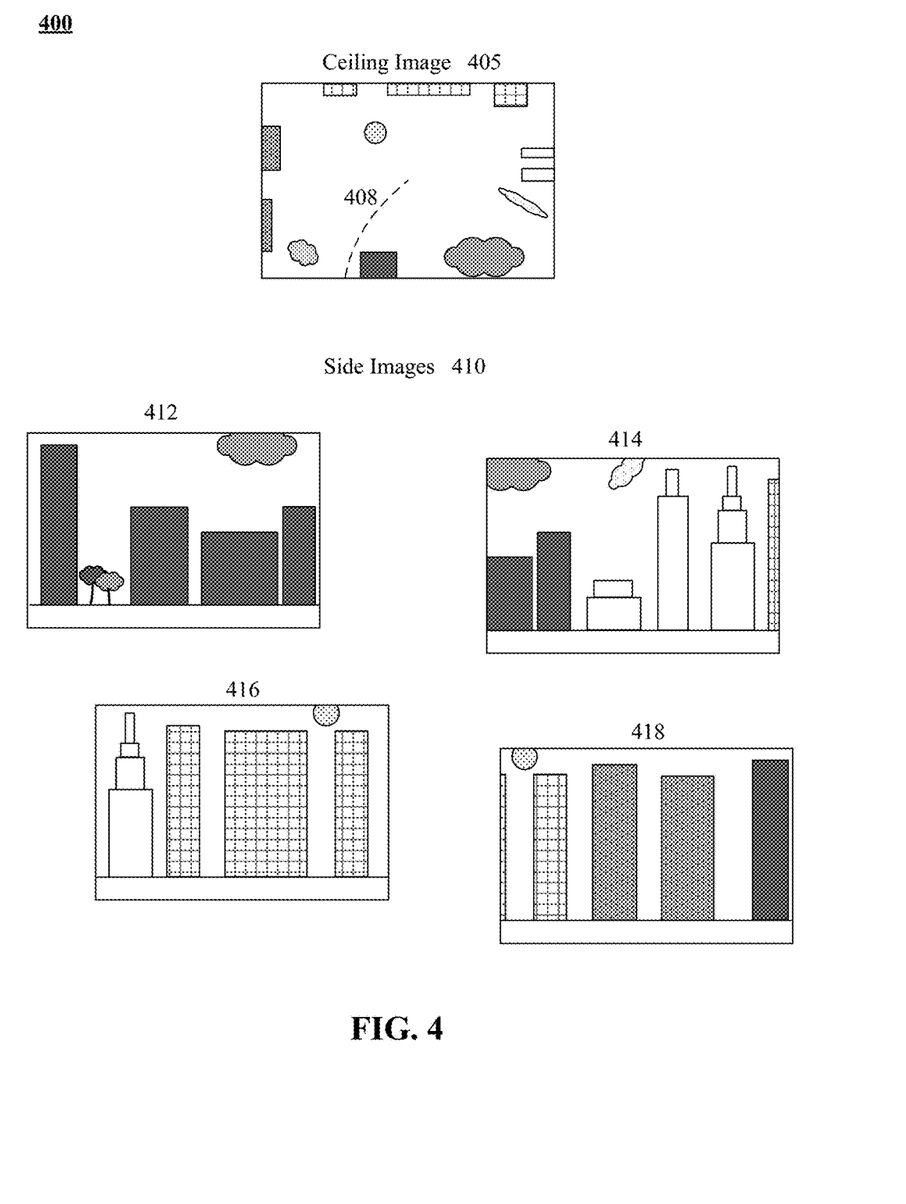
FIG. 4 is an example of a hemispherical-coverage panoramic image set in accordance with an embodiment of the inventive arrangements disclosed herein.

FIG. 4 is an example of a hemispherical-coverage panoramic image set 400 in accordance with embodiments of the inventive arrangements disclosed herein. The hemispherical-coverage panoramic image set 400 can be utilized within the context of system 100, method 300, and/or captured by hemispherical-coverage panoramic digital image capture device 200.

Hemispherical-coverage panoramic image set 400 can include a ceiling image 405 and side images 410 of a cityscape. The side images 410 can include four overlapping images 412, 414, 416, and 418.

Figure 4A:
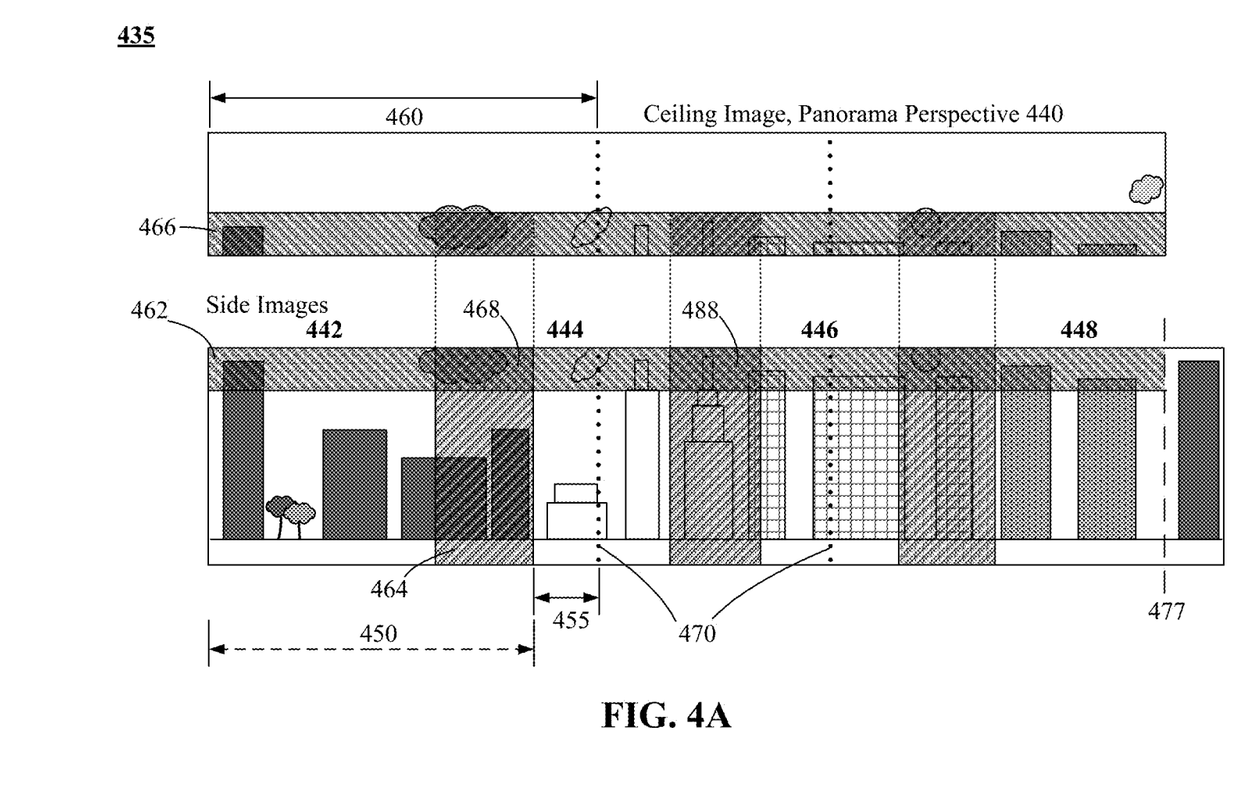
FIG. 4A is an illustration depicting the regions of overlap between adjacent side images and the ceiling image.

Illustration 435 of FIG. 4A can illustrate the alignment of the ceiling image 405 and side images 410 during creation of the hemispherical-coverage panoramic image. The ceiling image 405 of the hemispherical-coverage panoramic image set 400 can be transformed to a panorama perspective 440 by the ceiling transformation module in order to be aligned with the side images 442, 444, 446, and 448.

To create the panorama perspective 440, the original ceiling image 405 can be cut along a line 408 that corresponds to the beginning of the expected final panorama. Likewise, the side image 442 that is the beginning (i.e., the left-most edge) of the final panorama can also be identified to ensure appropriate alignment. Further, the last side image 448 that is the end (i.e., right-most edge) of the final panorama can be identified and cut along a determined line 477 to eliminate its overlap with the beginning of the panorama.

To elaborate upon the concepts and terms of the previous Figures, the merging of the left two side images 442 and 444 and the ceiling image 440 can be discussed in more detail. A bottom portion 466 of the ceiling image 440 can overlap with a corresponding top portion 462 of each side image 442, 444, 446, and 448. Similarly, a portion of the right-side of side image 442 can match a portion of the left-side of side image 444, creating an overlapping region 464. Therefore, the top portion of the overlapping region 464 can overlap with the ceiling image 440, defining a region 468 where all three images 442, 444, and 440 overlap.

The overlapping region 468 can represent a specific area of the location as simultaneously captured by three separate cameras. Since most conventional panorama capture devices and/or methods work with an area of overlap between two images, the exposure correction between the images can only be based upon the differences between two data points. The inclusion of a third overlapping image can provide the improved exposure correction handler with a third data point for making exposure correction calculations, and, therefore, can produce a better-looking final panoramic image.

For the sake of example, let us consider the following luminance values for the same pixel in each image. Using a typical grey level scale of 0-255 (where 0 represents black and 255 white), side image 442 can have a value of 130 (light grey), side image 444 can have a value of 210 (very light grey), and the ceiling image 440 can have a value of 85 (medium grey).

Conventional exposure correction can attempt to equalize the difference between side image 442 at 130 with side image 444 at 210, which would be skewed since side image 444 is much brighter than side image 442. However, the inclusion of the ceiling image 440 can provide the improved exposure correction handler with another point of reference.

For example, it can be possible that the value for side image 444 is so much brighter due to a glare or reflection hitting that camera and is not representative of the actual environment. The improved exposure correction handler can be configured to identify and disregard such localized outlying data points. That is, if two of the three data points are relatively close in value, the outlying data point can be dismissed for the purposes of exposure correction. Thus, the improved exposure correction handler can disregard the value for side image 444 and calculate the value for the composite matrix based on the values for side image 442 and the ceiling image 440.

Once exposure correction is completed for the overlapping region 468, the affected regions 450, 455, and 460 of the corresponding images 442, 444, and 440 can be corrected. An affected region 450, 455, and 460 of an image 442, 444, and 440 can be the portion of the image 442, 444, and 440 that is going to be in the final panoramic image. It can be up to the specific implementation of the panoramic image stitching system to determine which image will contribute the overlapping regions 464 and 468 to the final panoramic image.

For example, the panoramic image stitching system can be configured to use side image 442 for the overlapping regions 464 and 468. Therefore, the affected region 450 of side image 442 can be its entirety. The overlapping region 464 can be removed from side image 444 after exposure correction.

The affected region 455 of side image 444 can be much smaller because side image 444 also overlaps with side image 446 that creates another overlapping region 488 of three images that exposure correction will be performed upon. In order to minimize conflict between the exposure correction performed on each overlapping region 468 and 488 that will influence the overall exposure correction of side image 444, the improved exposure correction handler can apply each exposure correction to a smaller portion of side image 444, about half of the non-overlapping image 444. The line that acts as the boundary between these two differently affected regions can be a blending seam 470.

Since the ceiling image 440 will be included in the final panoramic image, the blending seams 470 can be extended or projected onto the ceiling image 440. Because the ceiling image 440 is already a panorama (i.e., does not have natural boundaries along the horizontal axis), the blending seams 470 can be used and boundaries for the affected regions 460 of the ceiling image 440. Thus, the affected region 460 of the ceiling image 440, in this example, can begin at the left-most edge and end at the first blending seam 470.

Once all the exposure corrections are completed and the images 440, 442, 444, 446, and 448 merged into the final panorama, additional processing like gradient blending can be performed across the blending seams 470 to smooth exposure differences between two exposure corrections performed on separate portions of the same image.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for panorama exposure correction comprising:
   receiving of a hemispherical-coverage panoramic digital image set by a panoramic image stitching system, wherein the hemispherical-coverage panoramic digital image set is captured by a hemispherical-coverage panoramic digital image capture device that utilizes a hemispherical panoramic camera module comprising at least three side digital cameras in fixed positions circumferentially-parallel with a base of the hemispherical panoramic camera module and one ceiling digital camera in a fixed upwards position perpendicular to the at least three circumferentially-parallel digital cameras, wherein a field of view of each side digital camera overlaps with the field of view of its neighboring side digital cameras and the field of view of the ceiling digital camera, wherein said hemispherical-coverage panoramic digital image set is then comprised of a ceiling image and at least three side images that are all captured simultaneously;
   aligning images of the hemispherical-coverage panoramic digital image set to create a panoramic image;
   based on said alignment, identifying overlapping regions between two adjacent side images and the ceiling image;
   based on said alignment and identified overlapping regions, determining a placement of blending seams, wherein a blending seam is an artificial vertical line that acts as a boundary between exposure corrections performed for two overlapping regions, wherein the blending seam is placed at a halfway point between the two overlapping regions in a non-terminal side image, wherein the blending seams are extended onto the ceiling image;
   based on said alignment and identified overlapping regions, determining a region of each image to be affected by a exposure correction of the overlapping region, wherein an affected region of a terminal side image is an entirety of the terminal side image, wherein the affected region of the non-terminal side image is horizontally bounded by an edge contained in the overlapping region and the blending seam of the non-terminal side image, wherein the affected region of the ceiling image is horizontally bounded by one of a terminating edge and the blending seam and two blending seams;
   determining the exposure correction for each identified overlapping region, wherein the exposure correction normalizes exposure between the two adjacent side images and ceiling image;
   adjusting a exposure of the affected region of each image contributing to the overlapping region in accordance with the determined exposure correction; and
   performing a gradient blending for a predefined area across the blending seams.

2. The method of claim 1, wherein aligning of the hemispherical-coverage panoramic digital image set further comprises:
   identifying a starting image from the at least three side images, wherein the starting image represents a beginning of the final panorama; and
   transforming the ceiling image from an original perspective into a panorama perspective, wherein sections of the ceiling image positioned along edges in the original perspective are all repositioned to a bottom edge in the panorama perspective, wherein features in the beginning of the ceiling image in the panorama perspective correspond to features in the starting image and features in the bottom edge in the panorama perspective correspond to features at a top edge of the at least three side images.

3. The method of claim 2, wherein transforming the digital image further comprises:
   applying at least one image processing function to the ceiling image to adjust for at least one of distortion, parallax, resolution differences, and lens differences.

4. The method of claim 1, wherein determining the exposure correction for each image further comprises:
   calculating a luminance matrix Z for pixels within the identified overlapping region that is a numerical average of luminance value matrices A, B, and C, wherein matrix A is a subset of a matrix $I_A$ that expresses luminance values for pixels of a first side image within the identified overlapping region, matrix B is a subset of a matrix $I_B$ that expresses luminance values for pixels of a second side image within the identified overlapping region, and matrix C is a subset of a matrix $I_C$ that expresses luminance values for pixels of the ceiling image within the identified overlapping region, wherein matrices $I_A$, $I_B$, and $I_C$ represent the luminance values for the affected regions of the first, second, and ceiling images, respectively; and executing a histogram equalization upon the luminance matrix Z using a histogram equalization formula, wherein a matrix Z' is a result of said histogram equalization, wherein the histogram equalization function is the exposure correction.

5. The method of claim 4, wherein adjusting the exposure of the affected region of each image further comprises:
replacing matrices A, B, and C with matrix Z' within matrices $I_A$, $I_B$, and $I_C$, respectively; and
independently performing the histogram equalization upon each matrix $I_A$, $I_B$, and $I_C$.

6. The method of claim 5, wherein the histogram equalization performed upon matrices $I_A$, $I_B$, and $I_C$ is weighted based on a distance of a pixel from the overlapping region.

7. The method of claim 4, wherein calculating the luminance matrix Z further comprises:
for each luminance value in matrices A, B, and C at a position (m, n), computing luminance differences between each unique luminance value set, wherein m and n are integer values bound by M and N, respectively, that define a size of the matrices A, B, and C;
comparing each luminance difference to an outlier threshold that represents a maximum degree of variation between luminance values; and
when both luminance differences for a luminance value exceed the outlier threshold, discarding the luminance value from the calculation.

8. The method of claim 1, wherein the hemispherical-coverage panoramic digital image capture device captures digital video, wherein the hemispherical-coverage panoramic digital image set is a set of video frames for an identical time index.

9. The method of claim 1, wherein the panoramic image stitching system is a software application that operates on one of the hemispherical-coverage panoramic digital image capture device and at least one computing device remotely-located from the hemispherical-coverage panoramic digital image capture device.

10. The method of claim 1, wherein receiving the hemispherical-coverage panoramic digital image set further comprises:
ascertaining a colorspace of the hemispherical-coverage panoramic digital image set; and
when the ascertained colorspace is not a hue, saturation, and value (HSV) colorspace, converting the colorspace of the hemispherical-coverage panoramic digital image set to HSV.

11. A computer program product comprising a non-transitory computer readable storage medium having computer usable program code embodied therewith, the computer usable program code comprising:
computer usable program code configured to receive a hemispherical-coverage panoramic digital image set that was captured by a hemispherical-coverage panoramic digital image capture device that utilizes a hemispherical panoramic camera module comprising at least three side digital cameras in fixed positions circumferentially-parallel with a base of the hemispherical panoramic camera module and one ceiling digital camera in a fixed upwards position perpendicular to the at least three circumferentially-parallel digital cameras, wherein a field of view of each side digital camera overlaps with the field of view of its neighboring side digital cameras and the field of view of the ceiling digital camera, wherein said hemispherical-coverage panoramic digital image set is then comprised of a ceiling image and at least three side images that are all captured simultaneously;
computer usable program code configured to align images of the hemispherical-coverage panoramic digital image set to create a panoramic image;
computer usable program code configured to, based on said alignment, identify overlapping regions between two adjacent side images and the ceiling image;
computer usable program code configured to, based on said alignment and identified overlapping regions, determine a placement of blending seams, wherein a blending seam is an artificial vertical line that acts as a boundary between exposure corrections performed for two overlapping regions, wherein the blending seam is placed at a halfway point between the two overlapping regions in a non-terminal side image, wherein the blending seams are extended onto the ceiling image;
computer usable program code configured to, based on said alignment and identified overlapping regions, determine a region of each image to be affected by a exposure correction of the overlapping region, wherein an affected region of a terminal side image is an entirety of the terminal side image, wherein the affected region of the non-terminal side image is horizontally bounded by an edge contained in the overlapping region and the blending seam of the non-terminal side image, wherein the affected region of the ceiling image is horizontally bounded by one of a terminating edge and the blending seam and two blending seams;
computer usable program code configured to determine the exposure correction for each identified overlapping region, wherein the exposure correction normalizes exposure between the two adjacent side images and ceiling image;
computer usable program code configured to adjust a exposure of the affected region of each image contributing to the overlapping region in accordance with the determined exposure correction; and
computer usable program code configured to perform a gradient blending for a predefined area across the blending seams.

12. The computer program product of claim 11, wherein the computer usable program code for aligning of the hemispherical-coverage panoramic digital image set further comprises:
computer usable program code configured to identify a starting image from the at least three side images, wherein the starting image represents a beginning of the final panorama; and
computer usable program code configured to transform the ceiling image from an original perspective into a panorama perspective, wherein sections of the ceiling image positioned along edges in the original perspective are all repositioned to a bottom edge in the panorama perspective, wherein features in the beginning of the ceiling image in the panorama perspective correspond to features in the starting image and features in the bottom edge in the panorama perspective correspond to features at a top edge of the at least three side images.

13. The computer program product of claim 11, wherein the computer usable program code for determining the exposure correction for each image further comprises:
computer usable program code configured to calculate a luminance matrix Z for pixels within the identified overlapping region that is a numerical average of luminance value matrices A, B, and C, wherein matrix A is a subset of a matrix $I_A$ that expresses luminance values for pixels of a first side image within the identified overlapping region, matrix B is a subset of a matrix $I_B$ that expresses luminance values for pixels of a second side image within the identified overlapping region, and matrix C is a subset of a matrix $I_C$ that expresses luminance values for pixels of the ceiling image within the identified overlapping region, wherein matrices $I_A$, $I_B$, and $I_C$ represent the luminance values for the affected regions of the first, second, and ceiling images, respectively; and computer usable program code configured to execute a histogram equalization upon the luminance matrix Z using a histogram equalization formula, wherein a matrix Z' is a result of said histogram equalization, wherein the histogram equalization function is the exposure correction.

14. The computer program product of claim 13, wherein the computer usable program code for adjusting the exposure of the affected region of each image further comprises:

computer usable program code configured to replace matrices A, B, and C with matrix Z' within matrices $I_A$, $I_B$, and $I_C$, respectively; and computer usable program code configured to independently perform the histogram equalization upon each matrix $I_A$, $I_B$, and $I_C$.

15. The computer program product of claim 14, wherein the histogram equalization performed upon matrices $I_A$, $I_B$, and $I_C$ is weighted based on a distance of a pixel from the overlapping region.

16. The computer program product of claim 13, wherein the computer usable program code for calculating the luminance matrix Z further comprises:

computer usable program code configured to, for each luminance value in matrices A, B, and C at a position (m, n), compute luminance differences between each unique luminance value set, wherein m and n are integer values bound by M and N, respectively, that define a size of the matrices A, B, and C;

computer usable program code configured to compare each luminance difference to an outlier threshold that represents a maximum degree of variation between luminance values; and computer usable program code configured to, when both luminance differences for a luminance value exceed the outlier threshold, discarding the luminance value from the calculation.

17. The computer program product of claim 11, wherein the computer usable program code for receiving the hemispherical-coverage panoramic digital image set further comprises:

computer usable program code configured to ascertain a colorspace of the hemispherical-coverage panoramic digital image set; and computer usable program code configured to, when the ascertained colorspace is not a hue, saturation, and value (HSV) colorspace, convert the colorspace of the hemispherical-coverage panoramic digital image set to HSV.

18. A panoramic image stitching system comprising:

a hemispherical-coverage panoramic digital image set captured by a hemispherical-coverage panoramic digital image capture device that utilizes a hemispherical panoramic camera module comprising at least three side digital cameras in fixed positions circumferentially-parallel with a base of the hemispherical panoramic camera module and one ceiling digital camera in a fixed upwards position perpendicular to the at least three circumferentially-parallel digital cameras, wherein a field of view of each side digital camera overlaps with the field of view of its neighboring side digital cameras and the field of view of the ceiling digital camera, wherein said hemispherical-coverage panoramic digital image set is then comprised of a ceiling image and at least three side images that are all captured simultaneously;

a panoramic image stitching software application configured to generate a panoramic image from the hemispherical-coverage panoramic digital image set, said panoramic image stitching software application further comprises:

a ceiling transformation module configured to transform the ceiling image from an original perspective to a panorama perspective;

a registration component configured to align adjacent side images with each other and the ceiling image, wherein the ceiling image is in the panorama perspective; and a merging component configured to combine the hemispherical-coverage panoramic digital image set as aligned by the registration component, said merging component further comprises:

an improved exposure correction handler configured to adjust a exposure of images in the hemispherical-coverage panoramic digital image set based upon luminance values in a region where two adjacent side images overlap with each other and the ceiling image.

19. The system of claim 18, wherein the hemispherical-coverage panoramic digital image capture device captures digital video, wherein the hemispherical-coverage panoramic digital image set is a set of video frames for an identical time index.

20. The system of claim 18, wherein the improved exposure correction handler further comprises:

a colorspace conversion module to convert a colorspace of the hemispherical-coverage panoramic digital image set to a hue, saturation, and value (HSV) colorspace, when necessary; and a histogram equalization module configured to perform a histogram equalization upon a set of input luminance values.

* * * * *